(12) United States Patent
Sugimoto et al.

(10) Patent No.: US 11,682,773 B2
(45) Date of Patent: Jun. 20, 2023

(54) ELECTROCATALYST

(71) Applicants: Shinshu University, Matsumoto (JP); ISHIFUKU Metal Industry Co., Ltd., Tokyo (JP)

(72) Inventors: Wataru Sugimoto, Ueda (JP); Dai Mochizuki, Ueda (JP); Yusuke Ayato, Ueda (JP); Tomohiro Ohnishi, Ueda (JP); Daisuke Takimoto, Ueda (JP)

(73) Assignees: Shinshu University, Matsumoto (JP); ISHIFUKU Metal Industry Co., Ltd., Tokyo (JP)

(*) Notice: Subject to any disclaimer, the term of this patent is extended or adjusted under 35 U.S.C. 154(b) by 34 days.

(21) Appl. No.: 17/209,646

(22) Filed: Mar. 23, 2021

(65) Prior Publication Data

US 2021/0234177 A1   Jul. 29, 2021

Related U.S. Application Data

(63) Continuation of application No. 16/039,109, filed on Jul. 18, 2018, now Pat. No. 10,985,382, which is a (Continued)

(30) Foreign Application Priority Data

Jan. 19, 2016 (JP) ............... JP2016-007531

(51) Int. Cl.
*H01M 4/00* (2006.01)
*H01M 4/92* (2006.01)
(Continued)

(52) U.S. Cl.
CPC .............. *H01M 4/925* (2013.01); *B01J 23/46* (2013.01); *B01J 35/02* (2013.01); *H01M 4/86* (2013.01);
(Continued)

(58) Field of Classification Search
CPC . H01M 4/86; H01M 2008/1095; H01M 4/885
See application file for complete search history.

(56) References Cited

U.S. PATENT DOCUMENTS

2003/0194598 A1* 10/2003 Chan ................. H01M 4/8605
429/524
2004/0018414 A1   1/2004 Adzic et al.
(Continued)

FOREIGN PATENT DOCUMENTS

JP   2010-188549 A   9/2010
JP   2010-280977 A   12/2010
(Continued)

OTHER PUBLICATIONS

Sugimoto et al. Fuel Cell Electrode Catalyst, See the Abstract. Oct. 2015 (Year: 2015).*
(Continued)

*Primary Examiner* — Cynthia H Kelly
*Assistant Examiner* — Monique M Wills
(74) *Attorney, Agent, or Firm* — Oblon, McClelland, Maier & Neustadt, L.L.P.

(57) ABSTRACT

An electrocatalyst including carbon and a nanosheet supported on the carbon. The nanosheet includes a metal ruthenium nanosheet, and a platinum atomic layer formed on an entire surface of the metal ruthenium nanosheet. The metal ruthenium nanosheet is a monoatomic layer, and the platinum atomic layer is a monoatomic layer or a monoatomic layer laminated body.

20 Claims, 7 Drawing Sheets

Related U.S. Application Data continuation-in-part of application No. PCT/JP2016/067048, filed on Jun. 8, 2016.

(51) Int. Cl.
*B01J 35/02* (2006.01)
*B01J 23/46* (2006.01)
*H01M 4/86* (2006.01)
*H01M 4/88* (2006.01)
*H01M 8/10* (2016.01)

(52) U.S. Cl.
CPC ......... *H01M 4/8657* (2013.01); *H01M 4/885* (2013.01); *H01M 4/92* (2013.01); *H01M 4/926* (2013.01); *H01M 8/10* (2013.01); *H01M 2008/1095* (2013.01)

(56) References Cited

U.S. PATENT DOCUMENTS

| | | | |
|---|---|---|---|
| 2013/0059231 A1 | 3/2013 | Hwang | |
| 2013/0189607 A1 | 7/2013 | Sakai | |
| 2014/0287237 A1* | 9/2014 | Mahler | B05D 1/00 428/404 |
| 2016/0087281 A1* | 3/2016 | Mashio | H01M 8/1004 429/482 |
| 2016/0126560 A1 | 5/2016 | Maruyama | |

FOREIGN PATENT DOCUMENTS

| | | |
|---|---|---|
| JP | 2011-134477 A | 7/2011 |
| JP | 2011-212666 A | 10/2011 |
| JP | 2013-58429 A | 3/2013 |
| JP | 2014-239033 A | 12/2014 |
| WO | WO 2015/146657 A1 | 10/2015 |
| WO | WO-2015146839 A1 * | 10/2015 .......... H01M 4/8652 |

OTHER PUBLICATIONS

Written Opinion of the International Searching Authority dated Jul. 26, 2016 in PCT/JP2016/067048, filed Jun. 8, 2016, (7 pages).
Ye et al., "Platinum-modified cobait nanosheets supported on three-dimensional carbon sponge as a high-performance catalyst for hydrogen peroxide electroreduction", Electrochimica Acta., vol. 178, Oct. 1, 2015, pp. 270-279.
Wang et al., "2D ultrathin core-shell Pd@Ptmonolayer nanosheets: defect-mediated thin film growth and enhanced oxygen reduction performance", Nanoscale, vol. 7, No. 28, 2015, pp. 11934-11939.
Takimoto et al., "Enhancement in CO Poisoning Resistance and Durability with Composite Catalyst of Ru Metal Nanosheet and PtRu/C", PS61, vol. 82, Mar. 9, 2015, 6 pages (Abstracts of Annual Meeting of the Electrochemical Society of Japan) (with computer generated English translation).
Inaba, "Development of Catalyst for Cathode of Proton-Exchange Membrane Fuel Cell, Technology for Low Platinum", Petrotech, vol. 33, No. 7, Jul. 1, 2010, pp. 487-490 (with computer generated English translation).
Yang et al., "Tuning the Catalytic Activity of Ru@Pt Core-Shell Nanoparticies for the Oxygen Reduction Reaction by Varying the Shell Thickness", The Journal of Physical Chemistry C, Jan. 31, 2013, vol. 117, No. 4, pp. 1748-1753.
Extended European Search Report dated Jun. 12, 2019 in Patent Application No. 16886377.7, 12 pages.
Katsutoshi Fukuda et al., Fabrication of Ruthenium Metal Nanosheets via Topotactic Metalization of Exfoliated Ruthenate Nanosheets, American Chemical Society, Inorganic Chemistry, 2013, 52, 2280-2282 (cited in the Chinese Office Action dated Jan. 4, 2021).

* cited by examiner

ELECTROCATALYST

CROSS REFERENCE TO RELATED APPLICATIONS

This application is a Continuation of U.S. patent application Ser. No. 16/039,109 filed Jul. 18, 2018, which is a Continuation-in-Part Application of International Application No. PCT/JP2016/067048 filed Jun. 8, 2016, claiming priority based on Japanese Patent Application No. 2016-007531, filed Jan. 19, 2016, the contents of all of which are incorporated herein by reference in their entirety.

FIELD OF THE INVENTION

The present invention relates to a core-shell structure type nanosheet. More specifically, the present invention relates to a core-shell structure type nanosheet composed of a metal nanosheet as the core, and platinum as the shell. The core-shell structure type nanosheet can be applied as an electrocatalyst for polymer electrolyte fuel cells and the like, for example.

BACKGROUND ART

To achieve wide-spread use of polymer electrolyte fuel cells, electrocatalysts with higher performance is required. Pt nanoparticles supported on carbon (Pt/C) is the current practical electrocatalyst.

However, since these catalysts use Pt which is expensive and limited in resource, studies have been conducted on decreasing the amount of platinum used. As an example of means for solving the problem, PtCo alloy nanoparticles supported on carbon (PtCo/C nanoparticle catalyst) has been developed. Further, as another example, electrocatalysts with a core-shell structure composed of Au and Ru or nanoparticle core coated with a thin layer of Pt as the shell has been developed (refer to Patent Document 1 and Non-Patent Document 1).

The electrocatalyst that supports, on carbon, a core-shell structure provided with a Pt atomic layer on the surface of Au nanoparticles is capable of decreasing the amount of Pt and further increasing a surface area. This makes it possible to improve the catalytic activity per unit mass of Pt and decrease the amount of Pt. Furthermore, the electrocatalyst uses Au nanoparticles as the core, and thus has the advantage of stability as well. Note that, in this electrocatalyst, a copper-underpotential disposition method (Cu-UPD method) based on an electrochemical reaction is applied as means for providing the Pt atomic layer on the surface of the Au nanoparticles.

Additionally, it has been reported that a core-shell catalyst provided with a Pt atomic layer in one to three monolayers on the surface of Ru nanoparticles has oxygen reduction reaction activity in an amount about three to five times that of the Pt/C catalyst (refer to Non-Patent Document 1).

Patent Documents

Patent Document 1: Japanese Laid-Open Patent Application No. 2011-212666
Patent Document 2: Japanese Laid-Open Patent Application No. 2010-280977
Patent Document 3: Japanese Laid-Open Patent Application No. 2010-188549

Non-Patent Documents

Non-Patent Document 1: YANG, Lijun et al., "Tuning the Catalytic Activity of Ru@Pt Core-Shell Nanoparticles for the Oxygen Reduction Reaction by Varying the Shell Thickness". The Journal of Physical Chemistry C., 31 Jan. 2013, vol. 117, no. 4, pp. 1748-1753.

SUMMARY OF THE INVENTION

Problems to be Solved by the Invention

The electrocatalysts that use Pt nanoparticles or PtCo nanoparticles proposed in the past comprise nanoparticles having a diameter of approximately 3 nm, and these nanoparticles are thought to be configured by approximately 600 atoms. Accordingly, among the constituent atoms of the nanoparticles, the ratio of the number of atoms exposed on the particle surface is about 50%, and the atoms in the nanoparticle interior that cannot contribute to a reaction are wasted.

The electrocatalysts proposed in Patent Document 1 and Non-Patent Document 1 utilize Au and Ru nanoparticles instead of Pt nanoparticles, and are provided with a Pt atomic layer on the surface of the nanoparticles, resulting in the advantage that the Pt atoms in the particle interior are not wasted. Accordingly, such electrocatalysts have the advantage of making it possible to improve the catalytic activity per unit mass of Pt and decrease the amount of Pt, which is expensive. Nevertheless, the electrocatalysts utilize Au and Ru nanoparticles as core particles, and these nanoparticles are expensive, similar to the Pt nanoparticles. Furthermore, in the electrocatalysts that utilize nanoparticles, the nanoparticles may agglomerate and/or grow in size in the operation of a fuel cell, causing a deterioration in catalytic performance.

The present inventors, in the course of conducting studies on the further improvement of the catalytic activity of the electrocatalysts for fuel cells and the suppression of deterioration in catalytic performance based on such agglomeration and particle growth as with the nanoparticle catalysts, developed a novel core-shell structure type nanosheet.

It is therefore an object of the present invention to provide a novel core-shell structure type nanosheet.

Means for Solving the Problems

A core-shell structure type nanosheet according to the present invention comprises a metal nanosheet, and a platinum atomic layer provided on a surface of the metal nanosheet.

According to the present invention, the platinum atomic layer is provided on the surface of a metal nanosheet, and thus the following is achieved: (1) Unlike when conventional nanoparticles are used, the wasted atoms that cannot contribute to a reaction can be minimized. (2) The platinum atomic layer is provided on the surface of a metal nanosheet. Accordingly, for example, when the nanosheet is used as a catalyst, the catalytic activity per unit mass of platinum can be improved. Furthermore, a decrease in the amount of expensive platinum can be achieved. (3) With the nanosheet structure, unlike when conventional nanoparticles are used, the nanoparticles are less susceptible to agglomeration and/or growth. As a result, for example, when the nanosheet is utilized as a catalyst, a deterioration in the catalytic performance can be suppressed.

The core-shell structure type nanosheet according to the present invention can be configured so that the platinum atomic layer is provided to the entire surface of the metal nanosheet. According to this invention, the platinum atomic layer is provided to the entire surface of the metal nanosheet and thus, when the nanosheet is utilized as a catalyst, for example, low activity parts where the platinum atomic layer is nonexistent can be minimized.

In the core-shell structure type nanosheet according to the present invention, use as an electrocatalyst is preferred. According to this invention, the nanosheet is used as an electrocatalyst for a fuel cell and the like, making it possible to achieve further improvement in the catalytic activity of the electrocatalyst (electrocatalyst for a polymer electrolyte fuel cell, for example) and suppression of deterioration in catalytic performance based on such agglomeration and particle growth as with a nanoparticle catalyst.

In the core-shell structure type nanosheet according to the present invention, the electrocatalyst can be used as a cathode catalyst or an anode catalyst. According to this invention, when the nanosheet is used as a cathode catalyst, the oxygen reduction activity can be further increased, and the deterioration in catalytic performance can be suppressed. Further, when the nanosheet is used as an anode catalyst, a carbon monoxide poisoning resistance (CO poisoning resistance) and durability can be further increased.

Effect of the Invention

According to the present invention, it is possible to provide a novel, unconventional core-shell structure type nanosheet.

Further, according to the core-shell structure type nanosheet of the present invention, the following can be achieved. (1) Unlike when conventional nanoparticles are used, the wasted atoms that cannot contribute to a reaction can be minimized. (2) For example, when the nanosheet is used as a catalyst, the catalytic activity per unit mass of platinum can be improved. Furthermore, a decrease in a usage amount of the expensive platinum can be achieved. (3) The nanoparticles are less susceptible to agglomeration and/or growth and thus, when the nanosheet is utilized as a catalyst, for example, a deterioration in the catalytic performance can be suppressed.

EMBODIMENTS OF THE INVENTION

A core-shell structure type nanosheet according to the present invention is described in detail below. Note that the range of the present invention is not limited to only the described content of the embodiments, examples, and the like below.

[Core-Shell Structure Type Nanosheet]

Figure 1:
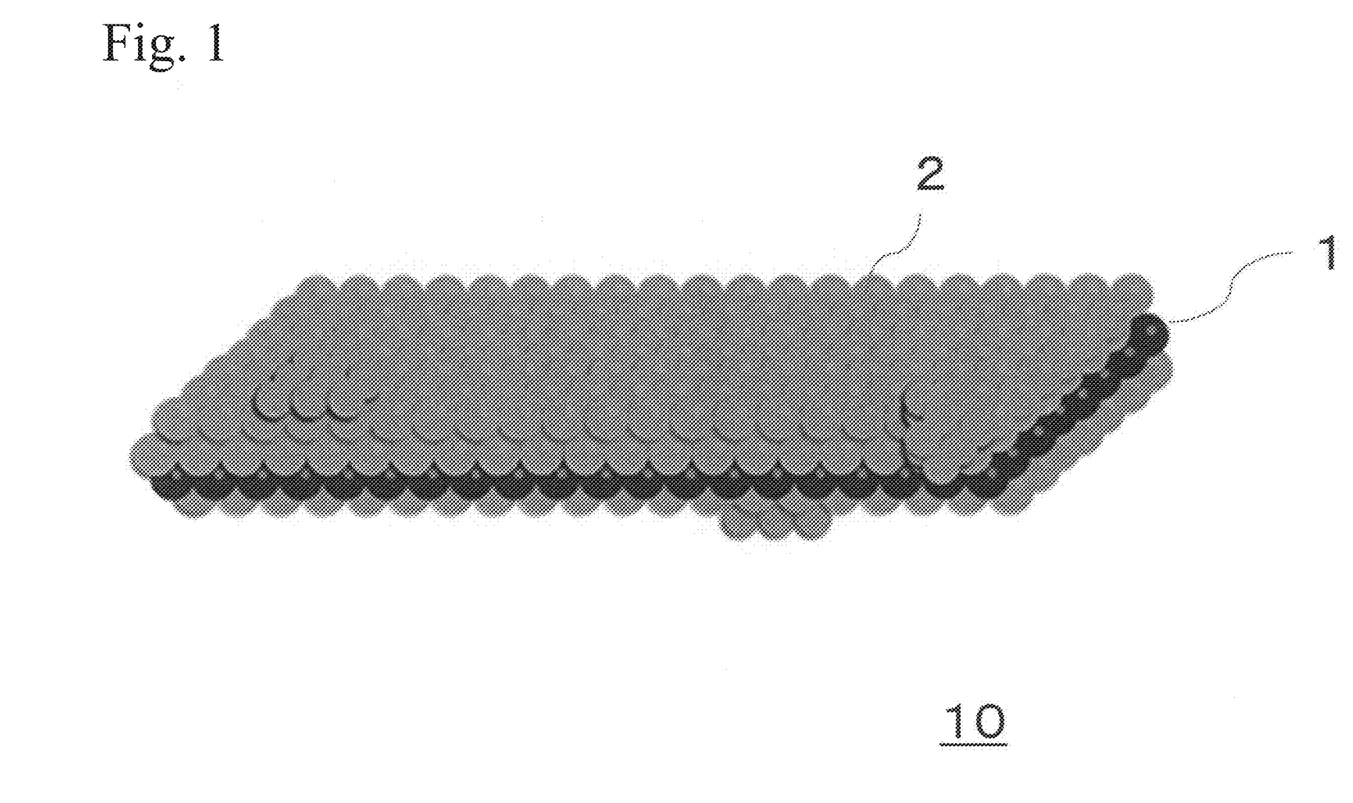
FIG. 1 is a schematic diagram for explaining a core-shell structure type nanosheet according to the present invention.
Figure 2:
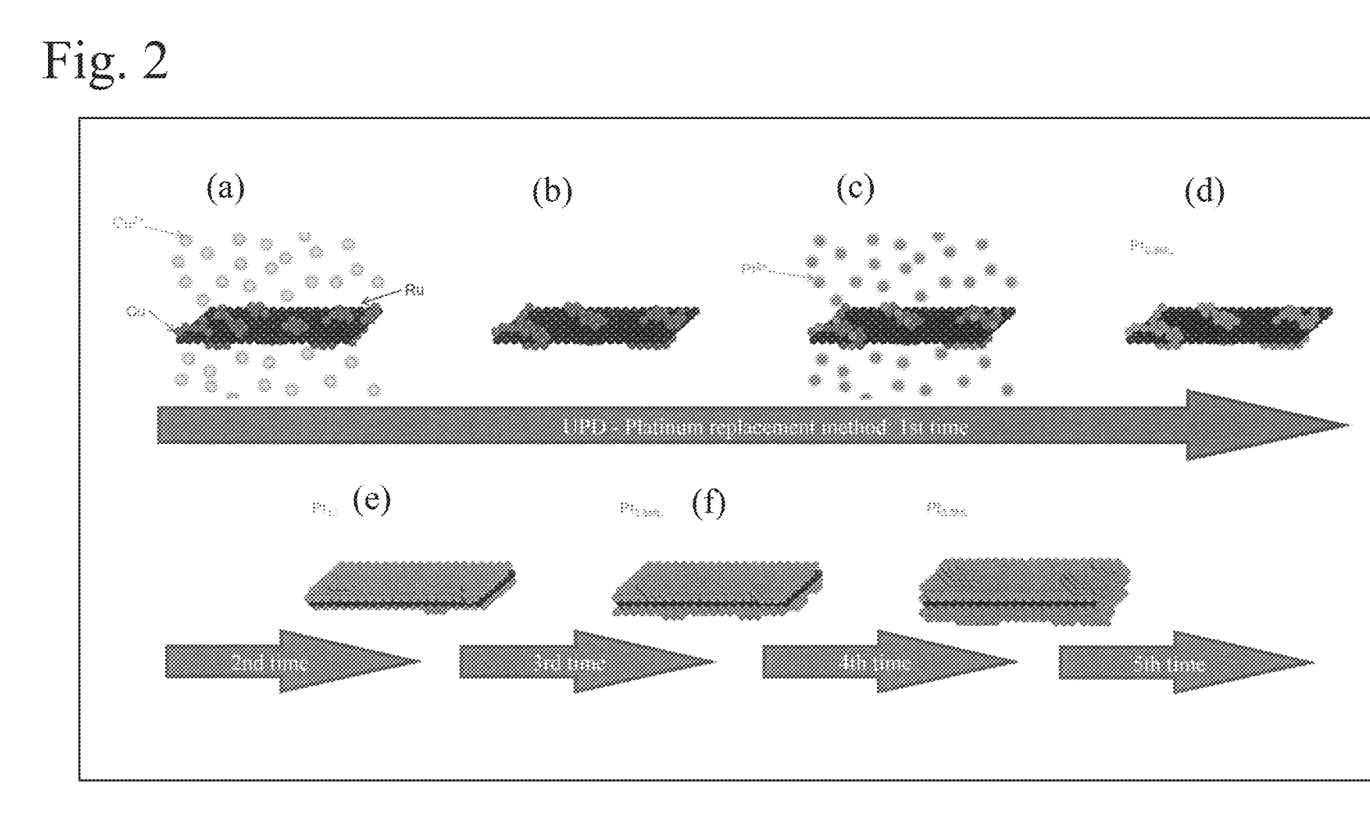
FIG. 2 is a schematic diagram for explaining formation steps of a platinum atomic layer by a UPD-platinum replacement method.

The present invention is a novel core-shell structure type nanosheet 10. The core-shell structure type nanosheet 10 comprises a metal nanosheet 1, and a platinum atomic layer 2 provided on a surface of the metal nanosheet 1, as illustrated in FIG. 1. The platinum atomic layer 2, as illustrated in FIG. 2, is formed by an underpotential deposition method-platinum replacement method (abbreviated as "UPD-platinum replacement method" in the present application), and by coating monoatomic layers according to the number of repetitions of the formation step.

Such a core-shell structure type nanosheet 10 comprises the platinum atomic layer 2 on the surface of the metal nanosheet 1. Accordingly, the following can be achieved: (1) Unlike when conventional nanoparticles are used, unused atoms that cannot contribute to a reaction can be minimized. (2) The platinum atomic layer 2 is provided on the surface of the metal nanosheet 1 and thus, when the metal nanosheet 1 is utilized as a catalyst, for example, the catalytic activity per unit mass of platinum can be improved. Further, a decrease in a usage amount of the expensive platinum can be achieved. (3) With the nanosheet structure, unlike when conventional nanoparticles are used, the nanoparticles are less susceptible to agglomeration and/or growth and thus, when the metal nanosheet 1 is utilized as a catalyst, for example, a deterioration in the catalytic performance can be suppressed.

The components of the core-shell structure type nanosheet are described below.

(Metal Nanosheet)

The metal nanosheet 1 is a sheet-like substance having a plate-like morphology. The thickness of the metal nanosheet 1 is theoretically approximately 0.2 to 0.3 nm and, in actual measurement, from nanometers order to sub-nanometer order. Such a thickness differs according to whether the metal nanosheet 1 is formed by a monoatomic layer, or configured by multiple monoatomic layers. The thickness of the metal nanosheet 1 is selected as desired by the type of constituent materials, ease of manufacture, characteristics (catalytic characteristics, for example) and the like. Further, a maximum length of the metal nanosheet 1 in an in-plane direction is in the several hundred nm to μm order, and a length orthogonal to an intermediate point of the maximum length is also in the several hundred nm to μm order. Because such a metal nanosheet 1 is extremely thin, unlike when conventional nanoparticles are used, it is possible to minimize the unused atoms that cannot contribute to a reaction, regardless of the sheet material.

Examples of the constituent materials of the metal nanosheet 1 include ruthenium, iridium, titanium, niobium, vanadium, manganese, nickel, cobalt, molybdenum, and the like. The thickness and the dimensions in the in-plane direction described above differ according to the type of constituent materials of the metal nanosheet 1. The cause of such change is based on the components of the metal compound nanosheet serving as a precursor of the metal nanosheet. Note that, in the example described later, a core-shell structure type nanosheet comprising the metal nanosheet 1 made of ruthenium is manufactured, an electrocatalyst that supports the core-shell structure type nanosheet on carbon is manufactured, and the catalytic characteristics are evaluated. However, the constituent materials of the metal nanosheet 1 are not limited to ruthenium, allowing manufacture using the various constituent materials described above in the same way as ruthenium. In particular, the core-shell structure type nanosheet according to the present invention comprises the platinum atomic layer that contributes as a catalyst on the surface of the metal nanosheet 1, and thus has the advantage that the metal nanosheet itself does not need to have catalytic performance.

When the metal nanosheet 1 is attached to carbon to obtain the electrocatalyst, a durability of an electrocatalyst having high performance, specifically an electrocatalyst for a polymer electrolyte fuel cell, can be further improved. As a result, when an electrocatalyst is configured using this metal nanosheet 1, it is possible to relatively decrease a usage amount of the platinum.

(Method for Manufacturing Metal Nanosheet)

The metal nanosheet 1 can be manufactured by the method set forth in the above-described Patent Document 2 that has already been submitted by the applicants. That is, the metal nanosheet 1 can be manufactured by a method comprising a step of preparing a layered metal compound composed of a metal compound with a layered shape (preparation step), a step of separating the layered metal compound and obtaining a metal compound nanosheet (separation step), a step of reducing the metal compound nanosheet and obtaining a metal nanosheet (reduction step). This manufacturing method is a technique for manufacturing the metal nanosheet 1 that uses a layered metal compound as a precursor by reducing a metal compound nanosheet obtained by separating the layered metal compound, and is capable of manufacturing a metal nanosheet made of the various constituent metals described above.

The preparation step is a step of preparing the layered metal compound comprising a metal compound layered into a layered shape. Examples of the layered metal compound prepared in this preparation step include a compound made of a metal sulfide, a metal oxide, a metal hydroxide, or a combination thereof, of ruthenium, iridium, titanium, niobium, vanadium, manganese, nickel, cobalt, molybdenum, or the like. Further, the layered metal compound may include a clay mineral component such as a silicon compound or an aluminum compound.

The layered metal compound can be obtained by various methods such as a solid-phase reaction method, a uniform precipitation method, or a synthetic method based on a flux method. Examples include layered ruthenium oxide. In an example described later, ruthenium oxide and potassium carbonate are weighed to predetermined amounts and wet-mixed, the mixed powder is then pelletized, and the pellets are burned. Next, the burned pellets are pulverized and washed to obtain a K-type layered ruthenium oxide. Furthermore, the K-type layered ruthenium oxide is subjected to an acid treatment, washed, and filtered to obtain a K-inductive hydrogen-type layered ruthenium oxide. Note that, as long as a layered metal compound is manufactured, changes can be made to the manufacturing process as appropriate.

The prepared layered metal compound is reduced after the separation step to form a metal nanosheet comprising a single layer or a plurality of layers.

Separation may be performed using an infinite swelling process of introducing different types of ions or solvent molecules between the layers of the layered metal compound or layered metal nanosheet to separate the layers.

The reduction step is a step of reducing the metal compound nanosheet, and obtaining a metal nanosheet that uses the layered metal compound as a precursor.

The metal compound nanosheet separated into a single layer or a plurality of layers by the separation step is reduced, and thus the metal nanosheet 1 comprising a single layer or a plurality of layers is obtained. Note that the metal nanosheet 1 comprising a plurality of layers may be used as is, or may be subsequently further separated to obtain the metal nanosheet 1 comprising a single layer.

Reduction in the reduction step may be performed using a dry process or a wet process. Examples of the dry process include a heat treatment under a reducing atmosphere that contains hydrogen. On the other hand, examples of the wet process include an immersion treatment in a reducing solution of sodium borohydride (NaBH$_4$) or the like.

The metal nanosheet 1 may be the metal nanosheet 1 comprising a single layer or the metal nanosheet 1 comprising a plurality of layers as described above. The metal nanosheet 1 comprising a plurality of layers may be obtained by way of self-organized thin film formation described in Patent Document 3, for example. However, the method is not limited to the method described in Patent Document 3.

Examples of the method by way of self-assembled thin film formation include forming a positive charge layer made of cationic polymers (polycations) on a substrate surface, and then absorbing the ruthenium oxide (RuO$_2$) nanosheet (anionic nanosheet/metal oxide nanosheet) by a self-assembly reaction in the positive charge layer to form a composite thin film of nanosheets and polymers. The ruthenium oxide nanosheet, which is a composite thin film, is obtained by partially layering nanosheets having a thickness of 2 nm or less and a horizontal size in the range of sub μm to several mm to form one nanosheet layer.

With such a manufacturing method, the metal nanosheet 1 comprising a single layer or a plurality of layers can be obtained. As a result, it is possible to obtain an extremely thin metal nanosheet 1 having an order of thickness equivalent to a monoatomic layer. Further, it is also possible to obtain the metal nanosheet 1 having an order of thickness equivalent to several atomic layers laminated in a plurality.

(Platinum Atomic Layer)

The platinum atomic layer 2 is provided to the entire or a portion of the surface of the metal nanosheet 1, as illustrated in FIG. 1. In particular, the platinum atomic layer 2 is preferably provided to the entire surface of the metal nanosheet 1. Note that "provided to the entire surface" means that the platinum atomic layer 2 covers the surface of the metal nanosheet 1 in its entirety. When the platinum atomic layer 2 is provided to the entire surface of the metal nanosheet 1 and the metal nanosheet 1 is used as a catalyst, for example, the advantage that low active parts where the platinum atomic layer 2 is nonexistent can be minimized is achieved.

The platinum atomic layer 2 may be provided as a monoatomic layer, or may be provided as a laminated monoatomic layers (a monoatomic layer laminated body). Both when the platinum atomic layer 2 is provided as a monoatomic layer and when monoatomic layers are provided in a laminated manner, the platinum atomic layer is provided as a thin layer. As a result, when platinum is used as a catalytic material, for example, the amount of unused platinum in the interior of the particles that cannot contribute to a reaction can be minimized, unlike when conventional Pt nanoparticles are used as the catalytic material. Accordingly, the catalytic activity per unit mass of platinum can be improved. Such a configuration also has the advantage of leading to a decrease in a usage amount of the expensive platinum.

Further, according to the present invention, the platinum atomic layer 2 is provided on the surface of the metal nanosheet 1 rather than the surface of the nanoparticles, making the electrocatalysts less susceptible to agglomeration and/or growth, unlike when conventional nanoparticles are used. As a result, when the metal nanosheet 1 is utilized as a catalyst, for example, the remarkable advantage that a deterioration in the catalytic performance can be suppressed is achieved.

(Formation Method of Platinum Atomic Layer)

The platinum atomic layer 2 is formed on the surface of the metal nanosheet 1. The formation method of the platinum atomic layer 2 is not particularly limited, allowing formation using various deposition methods. Examples of the deposition method of the platinum atomic layer 2 on the surface of the metal nanosheet 1 include an underpotential deposition method (hereinafter abbreviated as "UPD-platinum replacement method"). Additionally, the method may be a deposition method that uses lead or hydrogen, or another deposition method. Below, a description is provided using formation of the platinum atomic layer by the UPD-platinum replacement method as an example.

FIG. 2 is a schematic explanatory diagram of the steps of forming the platinum atomic layer by the UPD-platinum replacement method. In this UPD-platinum replacement method, the surface of the metal is covered with a monoatomic layer of copper. Subsequently, the metal is immersed in a hydrochloric acid solution in which chloroplatinic acid ions exist, thereby causing the copper and platinum to replace each other and thus form a monoatomic layer of platinum.

As a method for forming the platinum atomic layer 2 on the surface of the metal nanosheet 1 utilizing this UPD-platinum replacement method, first the metal nanosheet 1 attached to carbon is attached to an electrode. This electrode is held with potential applied in a solution containing copper ions, thereby causing a monoatomic layer of copper to be underpotential-deposited on the metal nanosheet, as illustrated in (a) and (b) in FIG. 2. Subsequently, as illustrated in (c) in FIG. 2, the metal nanosheet is immersed in a chloroplatinic acid solution to replace the copper atoms with platinum atoms. Thus, as illustrated in (d) in FIG. 2, the metal nanosheet 1 on which a monoatomic layer of platinum is formed is obtained.

Furthermore, this method is repeated, making it possible to laminate monoatomic layers, as illustrated in (e) and (f) in FIG. 2. (e) in FIG. 2 is a case where the UPD-platinum replacement method was applied twice. (f) in FIG. 2 is a case where the UPD-platinum replacement method was applied three times. Thus, the UPD-platinum replacement method can be repeated a plurality of times. As a result, the thickness of the platinum atomic layer can be increased. In particular, by repeating the method at least twice, it is possible to make the platinum atomic layer cover the entire surface of the metal nanosheet 1, resulting in the advantage of making it possible to minimize the low active parts where the platinum atomic layer 2 is nonexistent when used as a catalyst, for example.

The platinum atomic layer 2 may be formed by the UPD-platinum replacement method described above, or by another method, such as providing the platinum atomic layer at the monoatomic layer level, or providing monoatomic layers in a laminated state. As such another method, the platinum atomic layer may be provided using the method described in Patent Document 1. For example, a carbon support with the metal nanosheet attached is prepared, the preparation is added to water, and ultrasonication is performed, dispersing the carrier in the water. Then, an amount of platinum complex sufficient for covering the metal nanosheet (bivalent or tetravalent) is added, and agitation is performed for a predetermined amount of time under an inert atmosphere. Subsequently, centrifugation and washing by ultrapure water are performed, and the metal nanosheet is dried to form the platinum atomic layer 2 on the surface of the metal nanosheet.

As the platinum complex solution at this time, a solution that contains bivalent or tetravalent platinum ions is used.

Examples of solutions that contain bivalent platinum ions or tetravalent platinum ions include an aqueous solution of tetrachloroplatinic(II) acid, an aqueous solution of potassium tetrachloroplatinate(II), an aqueous solution of diamminedichloroplatinum(II), an aqueous solution of diamminedinitritoplatinum(II), an aqueous solution of tetraammineplatinum(II) chloride (monohydrate), an aqueous solution of hexachloroplatinic(IV) acid, an aqueous solution of potassium hexachloroplatinate(IV), and the like. Further, these platinum ions may exist in a solution in an anionic complex state, a cationic complex state, or a non-ionic complex state.

The thickness of the platinum atomic layer 2, while differing according to whether the metal nanosheet is formed by a monoatomic layer or a laminated body of monoatomic layers, is preferably within a range of 0.3 to 1.0 nm, inclusive, for example. When the thickness of the platinum atomic layer 2 is less than 0.3 nm, it becomes difficult to cover the entire surface of the metal nanosheet 1 with the platinum atomic layer 2. As a result, when the metal nanosheet 1 is utilized as a catalyst, for example, the low active parts where the platinum atomic layer 2 is nonexistent increase. On the other hand, when the thickness of the platinum atomic layer 2 exceeds 1.0 nm, the platinum atomic layer 2 increases in thickness. As a result, when the metal nanosheet 1 is utilized as a catalyst, for example, the platinum atoms that do not function as a catalyst relatively increase and the catalytic activity per unit mass of platinum decreases, making it impossible to decrease a usage amount of the expensive platinum.

(Core-Shell Structure Type Nanosheet)

The core-shell structure type nanosheet 10 according to the present invention is preferably used as an electrocatalyst for a fuel cell. When the core-shell structure type nanosheet 10 is used as an electrocatalyst for a fuel cell, it is possible to achieve further improvement in the catalytic activity of the electrocatalyst for a fuel cell (in particular, electrocatalyst for a polymer electrolyte fuel cell) and suppression of deterioration in catalytic performance based on such agglomeration and particle growth as with a nanoparticle catalyst.

The core-shell structure type nanosheet 10 according to the present invention can be used as a cathode catalyst or an anode catalyst, in particular. When the core-shell structure type nanosheet 10 is used as a cathode catalyst, the oxygen reduction activity can be further increased, and the deterioration in catalytic performance can be suppressed. Further, when the core-shell structure type nanosheet 10 is used as an anode catalyst, a carbon monoxide poisoning tolerance (CO poisoning tolerance) and a durability can be further increased.

For use as such an electrocatalyst, the core-shell structure type nanosheet needs to be supported on carbon. As the support, various carbons can be used. Examples of the support include carbon black, carbon nanotube, graphene, and the like. The size of the carbon can be selected as desired based on the relationship with the size of the metal ruthenium nanosheet.

As described above, according to the present invention, a novel, unconventional core-shell structure type nanosheet 10 is provided. Then, the core-shell structure type nanosheet 10 can minimize wasted atoms that cannot contribute to a reaction. Further, the core-shell structure type nanosheet 10 can improve the catalytic activity per unit mass of platinum, and can decrease the expensive platinum. Furthermore, when the core-shell structure type nanosheet 10 is utilized as a catalyst, for example, the remarkable advantage that a deterioration in the catalytic performance can be suppressed is achieved.

EXAMPLES

The present invention is specifically described below. In experimental examples below, a "core-shell structure type nanosheet made of a metal ruthenium nanosheet core/platinum shell" with a platinum atomic layer provided on the surface of a metal ruthenium nanosheet is described as an example. However, as long as the nanosheet is a core-shell structure type nanosheet made of a metal nanosheet core/platinum shell, the type of metal nanosheet is not limited to the metal ruthenium nanosheet.

Experimental Example 1

Initially, a ruthenium oxide nanosheet was manufactured and then attached to a carbon using a ruthenium oxide nanosheet colloid. Subsequently, the nanosheet was reduced to obtain a metal ruthenium nanosheet supported on carbon. Lastly, a platinum atomic layer was provided on the surface of the metal ruthenium nanosheet to manufacture a "core-shell structure type nanosheet made of a metal ruthenium nanosheet core/platinum shell." A sequential description is provided below.

<Manufacture of Ruthenium Oxide Nanosheet>

Initially, layered ruthenium oxide for obtaining a ruthenium oxide nanosheet was manufactured. The layered ruthenium oxide is a complex oxide of ruthenium oxide and an alkali metal (sodium, potassium, or the like). Among these, $K_{0.2}RuO_2+nH_2O$ and $Na_{0.2}RuO_2+nH_2O$ can be separated into single layer units owing to the ion exchange capability, making it possible to obtain a ruthenium oxide nanosheet.

Specifically, first the ruthenium oxide ($RuO_2$) and potassium carbonate ($K_2CO_3$) were weighted at a molar ratio of 8:5, and wet-mixed for one hour in acetone using an agate mortar. Subsequently, the mixed powder was pelletized. The pellets were then placed on an alumina boat and calcined for 12 hours at 850° C. under argon flow in a tube furnace. After calcination, the pellets were pulverized and washed using ultra-pure water, and supernatant was removed. The material obtained by repeating this operation until the supernatant became neutral was layered ruthenium oxide (potassium type).

Next, 1 M of HCl was added to the layered ruthenium oxide (potassium type) and subjected to an acid treatment for 72 hours at 60° C. in a water bath, replacing the $K^+$ ions contained in the layered ruthenium oxide (potassium type) with hydrogen ions (protons). Subsequently, washing was performed using ion exchange distilled water to remove the supernatant. This operation was repeated until the supernatant became neutral in pH. Filtering was then performed to obtain a layered ruthenium oxide (hydrogen type: $H_{0.2}RuO_{2.1}$) powder.

<Preparation of Ruthenium Oxide Nanosheet Colloid>

Next, a 10% tetrabutylammonium hydroxide (TBAOH) aqueous solution, as the exfoliating agent for obtaining a ruthenium oxide nanosheet, was added to the obtained layered $H_{0.2}RuO_{2.1}$. The concentration of the $H_{0.2}RuO_{2.1}$ to $TBA^+$ was set to $TBA^+/H^+=1.5$ at a ratio of TBAOH to protons, and the solid-liquid ratio was set to 4 g/L. Subsequently, the layered $H_{0.2}RuO_{2.1}$ was added to distilled water, and the mixture was agitated for 10 days. The ruthenium oxide nanosheet separated into single layers by this method was then centrifuged for 30 minutes at 2,000 rpm, the supernatant was recovered, and a ruthenium oxide nanosheet colloid having a concentration in ultrapure water of 10 mg/mL was obtained.

The dimensions of the ruthenium oxide nanosheet in the colloid were then measured as follows. First, a silicon wafer was immersed for 10 minutes in 1 mass % of a polyvinyl alcohol-polydiallyl amine copolymer aqueous solution, washed several times in water, and then dried. Next, 10 mg/mL of the ruthenium oxide nanosheet colloid was diluted to obtain 0.08 mg/mL of a ruthenium oxide nanosheet aqueous dispersion, the wafer was immersed for two minutes in this aqueous dispersion, washed several times in water, and then dried. The dimensions of the ruthenium oxide nanosheet were measured from an observation image of an atomic force microscope (AFM). Specifically, the maximum length and the length orthogonal at the mid-point of the maximum length of the ruthenium oxide nanosheet having a scale-like shape was measured, the average thereof was calculated, and obtained as the "dimension." This was repeated in 70 to 80 locations. As a result, the dimension of the ruthenium oxide nanosheet was 70% or greater overall for a ruthenium oxide nanosheet of 150 to 550 nm, inclusive, and a mode diameter was 200 to 450 nm, inclusive.

<Manufacture of Metal Ruthenium Nanosheet/Carbon Carrier>

Next, the ruthenium oxide nanosheet was attached to a carbon support using the ruthenium oxide nanosheet colloid. Subsequently, the ruthenium oxide nanosheet was reduced to manufacture the metal ruthenium nanosheet supported on carbon.

Specifically, first to combine the ruthenium oxide nanosheet with carbon having a high specific surface area, carbon was added to 15 mL of ultrapure water so as to obtain 10 mg/mL. Then, agitation and ultrasonication were performed for 30 minutes each to disperse the carbon and obtain a carbon dispersed solution. Next, a desired amount of ruthenium oxide nanosheet colloid was slowly dripped into this carbon dispersed solution while agitating the ruthenium oxide nanosheet colloid so as to attach the ruthenium oxide nanosheet to the carbon support at 10 mass %. While the concentration of the ruthenium oxide nanosheet colloid can be adjusted as desired, here the concentration was set to 10 mg/mL as described above. Furthermore, to ensure a uniform reaction, agitation, ultrasonication, standing at 60° C., and decantation (washing with water until pH neutral) were performed, in that order. Subsequently, the mixture was dried for 12 hours at 120° C. and then pulverized to obtain a "ruthenium oxide nanosheet/carbon." The obtained "ruthenium oxide nanosheet/carbon" was placed on an alumina boat, treated for two hours at 120° C. under a reducing atmosphere of hydrogen and nitrogen in a tube furnace, and reduced. The hydrogen and the nitrogen were mixed and introduced into the tube furnace at a flow rate of 10 cc/minute and 150 cc/minute, respectively. After burning, the mixture was pulverized to obtain a "metal ruthenium nanosheet/carbon."

<Manufacture of Metal Ruthenium Nanosheet Core/Platinum Shell>

Next, a platinum atomic layer was provided on the surface of the metal ruthenium nanosheet to manufacture a core-shell structure type nanosheet made of the "metal ruthenium nanosheet core/platinum shell."

Specifically, first 5 mg of the "metal ruthenium nanosheet/carbon" obtained in the above was mixed with 10 mL of a 2-propanol/ultrapure water solution (volume ratio: 75/25) to prepare a catalyst dispersion. 45 µL of a 5 mass % Nafion (registered trademark of DuPont Company) solution was added to this catalyst dispersion as a proton conductive binder for ensuring favorable adhesion to a test electrode. The catalyst dispersion thus obtained was then ultrasonicated for 30 minutes.

To provide a platinum atomic layer on the surface of the metal ruthenium nanosheet, the "metal ruthenium nanosheet/carbon" needs to be provided on an electrode and an underpotential deposition method (electrochemical means) needs to be applied. A glassy carbon having a 6-mm diameter was used as the electrode for this purpose, and an end surface thereof was buffered in advance using a 0.05-µm aluminum oxide powder. Subsequently, the electrode was dried at 60° C. in a vacuum. The end surface of the electrode was electrochemically cleaned using a 0.5 M $H_2SO_4$ (25° C.) electrolyte (E=0.05 to 0.8 V vs. RHE, v=50 mV/s). The catalyst dispersion described above was dropped onto the electrode end surface thus cleaned to manufacture an electrode provided to the experiment. The weight of the metal ruthenium nanosheet on the end surface of the electrode at this time was 0.45 µg. This electrode was dried at room temperature, and subsequently dried in a vacuum for 30 minutes at 60° C.

This electrode was held for 20 minutes at 0.3 V vs RHE (reversible hydrogen electrode) in 0.5 M $H_2SO_4$ containing 2 mM of copper sulfate degassed using nitrogen gas. Thus, a monoatomic layer of copper was underpotential-deposited on the surface of the metal ruthenium nanosheet. This electrode was quickly immersed in 0.5 M of a degassed potassium tetrachloroplatinate(II) aqueous solution and allowed to stand as is for 20 minutes, thereby replacing the copper atoms with platinum atoms to obtain a core-shell structure type nanosheet made of a metal ruthenium nanosheet core/platinum shell (UPD-platinum replacement method: 1 time). Note that the UPD-platinum replacement method by underpotential deposition and platinum replacement can be repeated, and the number of repetitions is indicated in parenthesis.

[Measurements and Results]

<Electrochemical Measurement>

The obtained core-shell structure type nanosheet was electrochemically measured by rotating disk electrode (RDE) measurement using standard three-electrode type electrochemical cells. As the working electrode, a glassy carbon having a 6-mm diameter and provided with the core-shell structure type nanosheet described above was used. As a counter electrode, a carbon fiber (manufactured by Toho Tenax Co., Ltd., HTA-3K, filament number: 3000) was used. As a reference electrode, a reversible hydrogen electrode (RHE) was used. RDE measurement was performed in 0.1 M $HClO_4$ electrolyte. The electrochemical measurements below were performed by this RDE measurement.

<Observation of Catalyst Morphology>

Figure 3A:
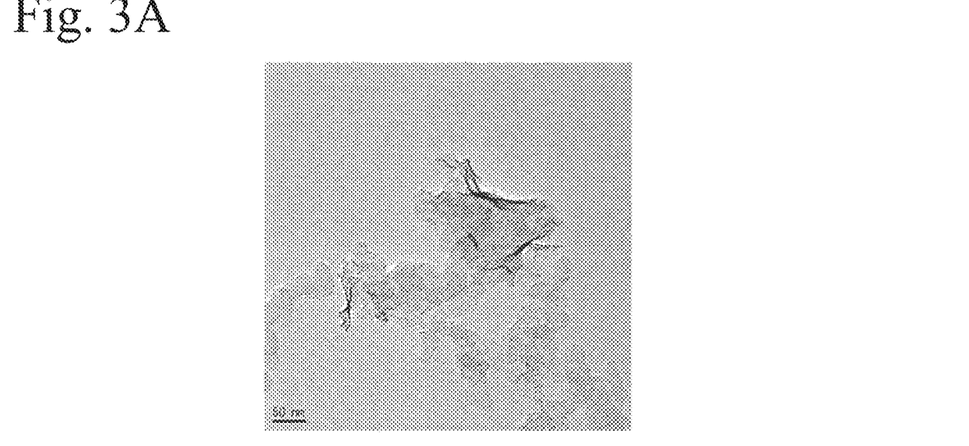
FIG. 3A is a transmission electron microscope image of an electrocatalyst that supports a metal ruthenium nanosheet on carbon.
Figure 3B:
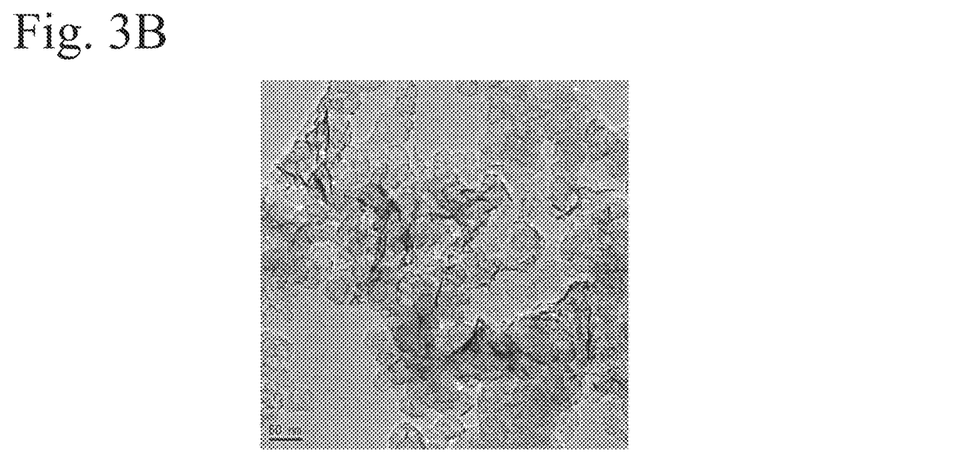
FIG. 3B is a transmission electron microscope image of an electrocatalyst that supports, on carbon, a core-shell structure type nanosheet made of a metal ruthenium nanosheet core/platinum shell (UPD-platinum replacement method: 2 times).
Figure 3C:
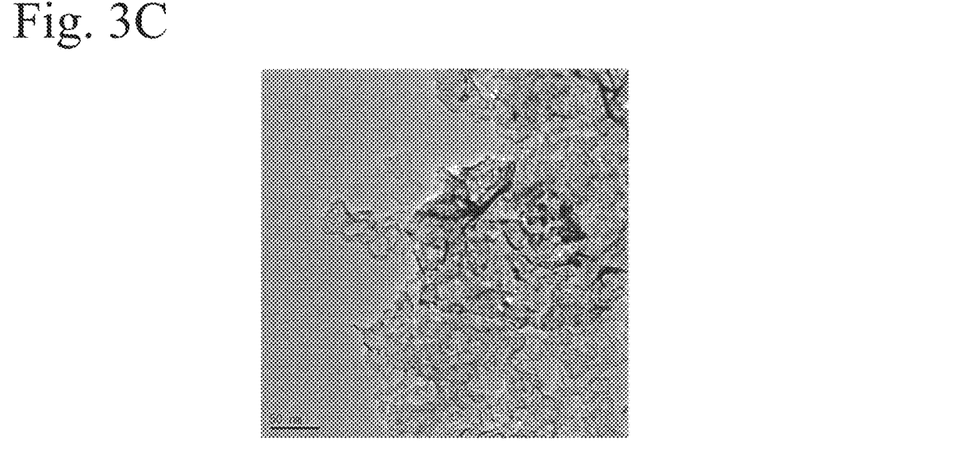
FIG. 3C is a transmission electron microscope image of an electrocatalyst that supports, on carbon, a core-shell structure type nanosheet made of a metal ruthenium nanosheet core/platinum shell (UPD-platinum replacement method: 4 times).

FIG. 3A is an electrocatalyst that supports a metal ruthenium nanosheet on carbon. FIG. 3B is an electrocatalyst that supports, on carbon, a core-shell structure type nanosheet made of a metal ruthenium nanosheet core/platinum shell (UPD-platinum replacement method: 2 times). FIG. 3C is an electrocatalyst that supports, on carbon, a core-shell structure type nanosheet made of a metal ruthenium nanosheet core/platinum shell (UPD-platinum replacement method: 4 times). A nanosheet mode of each of the core-shell structure type nanosheets shown in FIGS. 3B and 3C were successfully observed.

<Evaluation Experiment of Electrochemically Active Surface Area>

Figure 4:
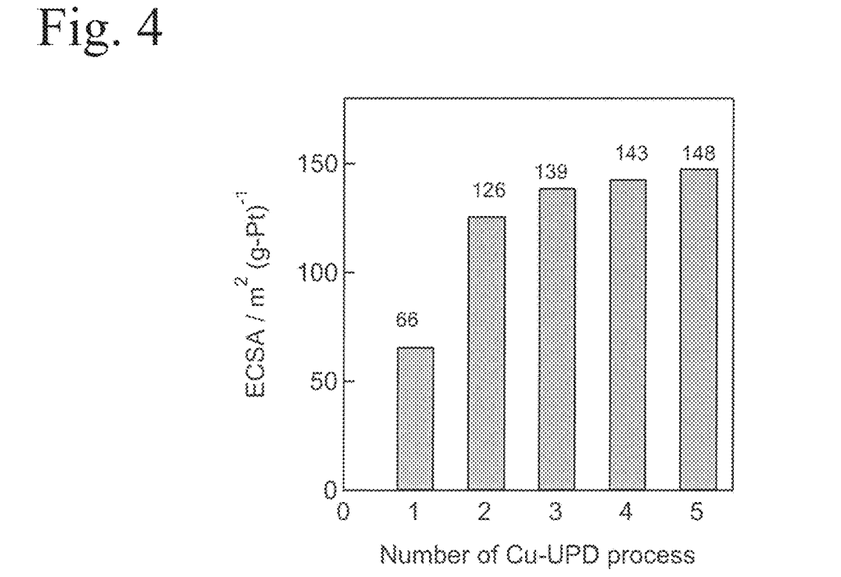
FIG. 4 is a graph showing the relationship between a number of times that the step of forming the platinum atomic layer by the UPD-platinum replacement method is repeated (1 to 5 times), and an electrochemically active surface area (ECSA) of the electrocatalyst that support, on carbon, the obtained core-shell structure type nanosheet made of the metal ruthenium nanosheet core/platinum shell.

FIG. 4 is a graph showing the relationship between the number of times that the step of forming the platinum atomic layer by the UPD-platinum replacement method is repeated (1 to 5 times), and the electrochemically active surface area (ECSA) of the electrocatalyst that supports, on carbon, the core-shell structure type nanosheet made of the obtained metal ruthenium nanosheet core/platinum shell (UPD-platinum replacement method: 1 to 5 times).

An electrochemically active surface area (ECSA) evaluation was conducted utilizing the results of a cyclic voltammogram based on the working electrode for RDE measurement described above. Specifically, the electrochemically active surface area (ECSA) was calculated from an amount of electricity in a hydrogen adsorption region of the cyclic voltammogram using working electrodes respectively subjected to the UPD-platinum replacement method 1 to 5 times. The ECSA was increased by repeating the UPD-platinum replacement method, and the difference between the first time and the second time was particularly large. With the second and subsequent repetitions, the ECSA gradually increased. The large difference between the first time and the second time is presumably based on the coverage ratio of the platinum atomic layer on the surface of the metal ruthenium nanosheet. This indicates that the platinum atomic layer did not sufficiently cover the surface the first time, but sufficiently covered the surface with second and subsequent repetitions. Further, the increase resulting from the second and subsequent repetitions is presumably caused by an increase in the roughness of the surface. Note that the ECSA of the conventionally known Pt nanoparticles (average diameter: 3 nm)/carbon was 79 $m^2$/(g-Pt), and thus an increase in ECSA of 1.6 to 1.9 times by the core-shell structure type nanosheet obtained in this experimental example 1 was confirmed.

<Evaluation Experiment of CO Oxidation Reaction Activity>

Figure 5:
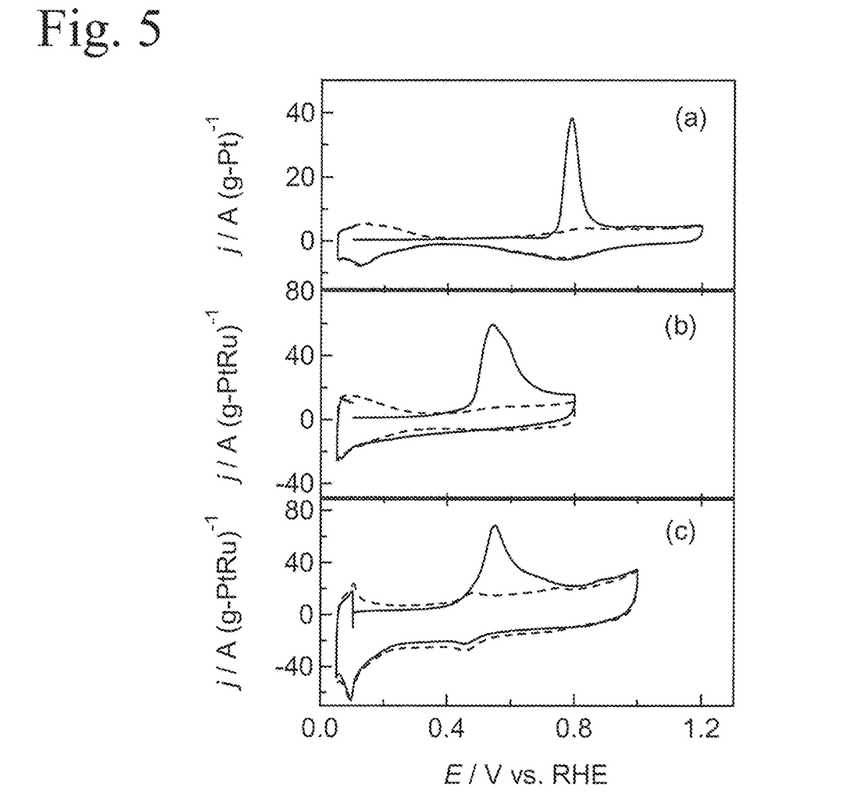
FIG. 5A is a CO stripping voltammogram for the electrocatalyst that supports Pt nanoparticles on carbon.
FIG. 5B is a CO stripping voltammogram for the electrocatalyst that supports platinum ruthenium nanoparticles on carbon.
FIG. 5C is a CO stripping voltammogram for an electrocatalyst that supports, on carbon, the core-shell structure type nanosheet made of a metal ruthenium nanosheet core/platinum shell (UPD-platinum replacement method: 2 times).

FIG. 5A is a CO stripping voltammogram for a conventionally known electrocatalyst that supports Pt nanoparticles on carbon (expressed by "Pt/C nanoparticles"). FIG. 5B is a CO stripping voltammogram for a conventionally known electrocatalyst that supports PtRu alloy nanoparticles on carbon (expressed by "PtRu/C"). FIG. 5C is a CO stripping voltammogram for an electrocatalyst that supports, on carbon, the core-shell structure type nanosheet according to the present invention made of a metal ruthenium nanosheet core/platinum shell (UPD-platinum replacement method: 2 times).

As shown in FIG. 5A, the CO oxidation peak potential was about 0.79 V in the Pt/C nanoparticles, and decreased to 0.57 V in the PtRu/C alloy, showing an improvement in CO oxidation reaction activity. In the core-shell structure type nanosheet made of the metal ruthenium nanosheet core/platinum shell (UPD-platinum replacement method: 2 times), the CO oxidation peak potential was 0.57 V, showing the same level of CO oxidation reaction activity as that of PtRu/C. Thus, utilization of the core-shell structure type nanosheet made of a metal ruthenium nanosheet core/platinum shell (UPD-platinum replacement method: 2 times) as an anode catalyst can be expected.

<Evaluation Experiment of Hydrogen Oxidation Reaction Activity>

Figure 6:
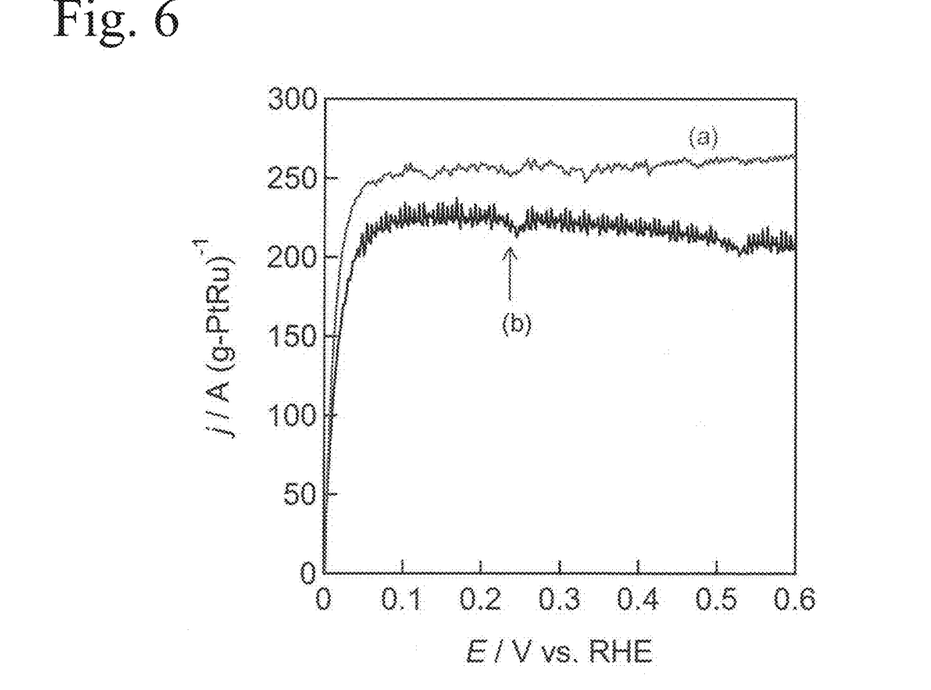
FIG. 6A is a linear sweep voltammogram in hydrogen for an electrocatalyst that supports, on carbon, the core-shell structure type nanosheet made of a metal ruthenium nanosheet core/platinum shell (UPD-platinum replacement method: 2 times).
FIG. 6B is a stripping voltammogram in hydrogen for the electrocatalyst that supports platinum ruthenium nanoparticles on carbon.

FIG. 6A is a linear sweep voltammogram in hydrogen amount for an electrocatalyst that supports, on carbon, a core-shell structure type nanosheet made of a metal ruthenium nanosheet core/platinum shell (UPD-platinum replacement method: 2 times). FIG. 6B is a stripping voltammogram in hydrogen for the electrocatalyst that supports PtRu nanoparticles on carbon.

As shown in FIGS. 6A and 6B, the current due to the hydrogen oxidation reaction of the core-shell structure type nanosheet made of the metal ruthenium nanosheet core/platinum shell (UPD-platinum replacement method: 2 times) was higher than that of PtRu/C, resulting in high hydrogen oxidation reaction activity.

<Evaluation Experiment of CO Resistance>

Figure 7:
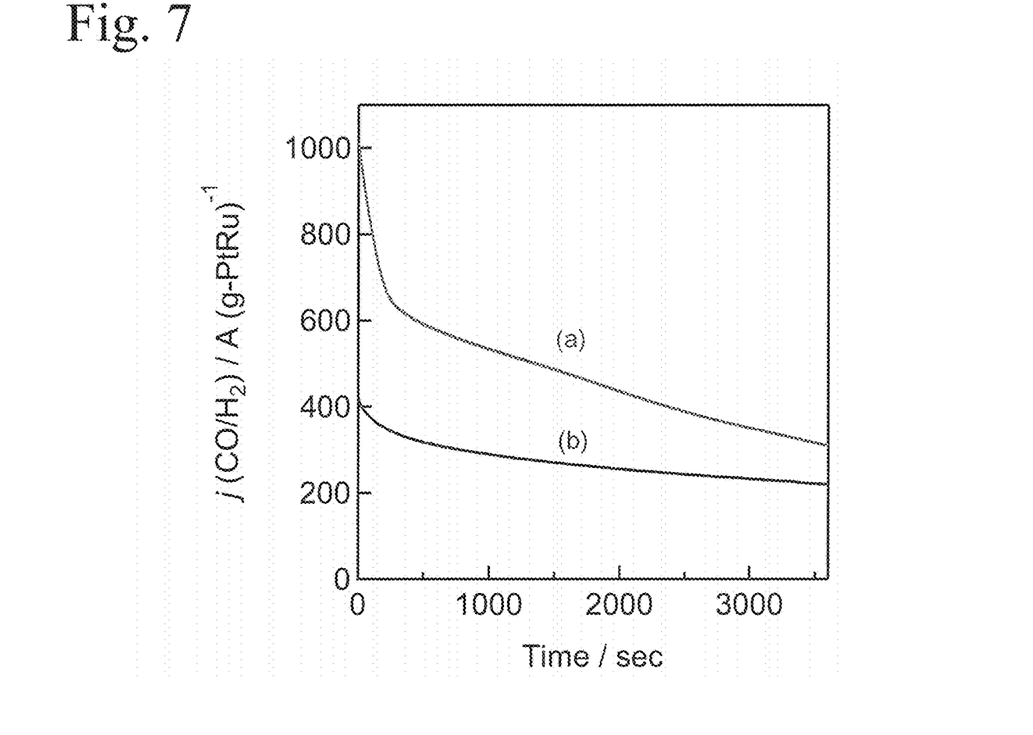
FIG. 7A is a chronoamperogram in 300 ppm of $CO/H_2$ for an electrocatalyst that supports, on carbon, the core-shell structure type nanosheet made of a metal ruthenium nanosheet core/platinum shell (UPD-platinum replacement method: 2 times).
FIG. 7B is a chronoamperogram in 300 ppm of $CO/H_2$ for the electrocatalyst that supports platinum ruthenium nanoparticles on carbon.

For the hydrogen oxidation reaction activity with respect to $CO/H_2$, the CO tolerance of the core-shell structure type nanosheet made of the metal ruthenium nanosheet core/platinum shell (UPD-platinum replacement method: 2 times) was studied by evaluating a decreasing speed of the current value applied to the hydrogen oxidation reaction. FIG. 7A is a chronoamperogram in 300 ppm of $CO/H_2$ for an electrocatalyst that supports, on carbon, the core-shell structure type nanosheet made of the metal ruthenium nanosheet core/platinum shell (UPD-platinum replacement method: 2 times). FIG. 7B is a chronoamperogram in 300 ppm of $CO/H_2$ for the electrocatalyst that supports PtRu nanoparticles on carbon.

As shown in FIG. 7A, even one hour (3,600 seconds) after measurement started, the hydrogen oxidation reaction current of the core-shell structure type nanosheet made of the metal ruthenium nanosheet core/platinum shell (UPD-platinum replacement method: 2 times) was higher than that of PtRu/C in FIG. 7B. Thus, the core-shell structure type nanosheet made of the metal ruthenium nanosheet core/platinum shell (UPD-platinum replacement method: 2 times) was found to have high CO tolerance.

Figure 8:
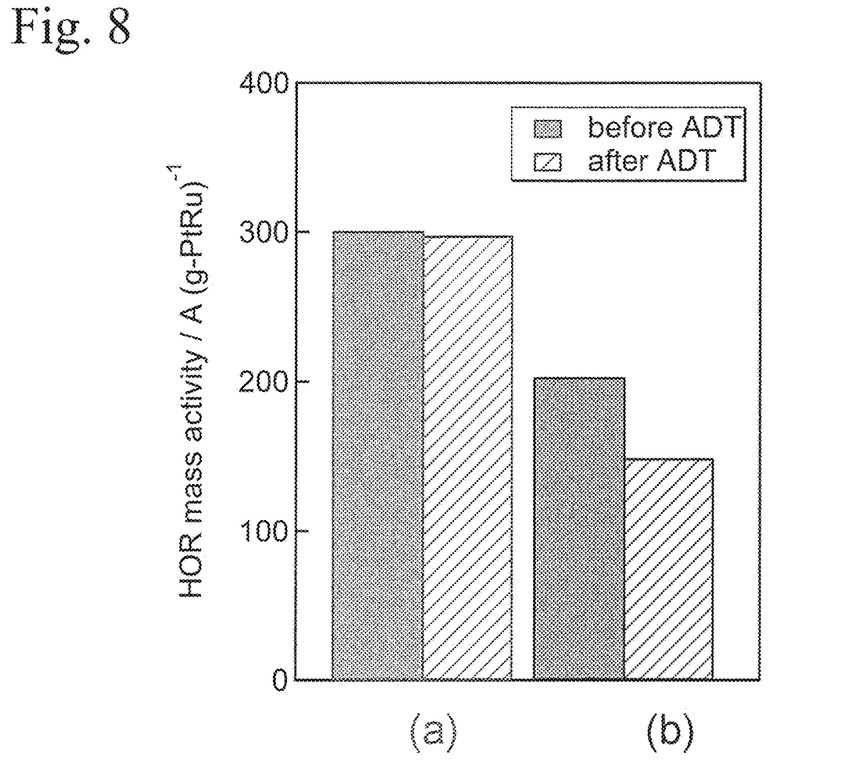
FIG. 8A shows hydrogen oxidation reaction activity in 300 ppm of $CO/H_2$, and hydrogen oxidation reaction activity after a durability test (0.05 to 0.4 V vs. RHE (held for three seconds each)) after 1,000 cycles for the electrocatalyst that supports, on carbon, the core-shell structure type nanosheet made of a metal ruthenium nanosheet core/platinum shell (UPD-platinum replacement method: 2 times).
FIG. 8B shows hydrogen oxidation reaction activity in 300 ppm of $CO/H_2$, and hydrogen oxidation reaction activity after a durability test (0.05 to 0.4 V vs. RHE (held for three seconds each)) after 1,000 cycles for the electrocatalyst that supports platinum ruthenium nanoparticles on carbon.

Further, even after the durability test, as shown in FIG. 8A, the hydrogen oxidation reaction (HOR) current of the core-shell structure type nanosheet made of the metal ruthenium nanosheet core/platinum shell (UPD-platinum replacement method: 2 times) not only substantially did not decrease, but was higher than that of PtRu/C in FIG. 8B. Thus, the core-shell structure type nanosheet made of the metal ruthenium nanosheet core/platinum shell (UPD-platinum replacement method: 2 times) was found to have high durability.

<Evaluation Experiment of ORR Activity>

Figure 9:
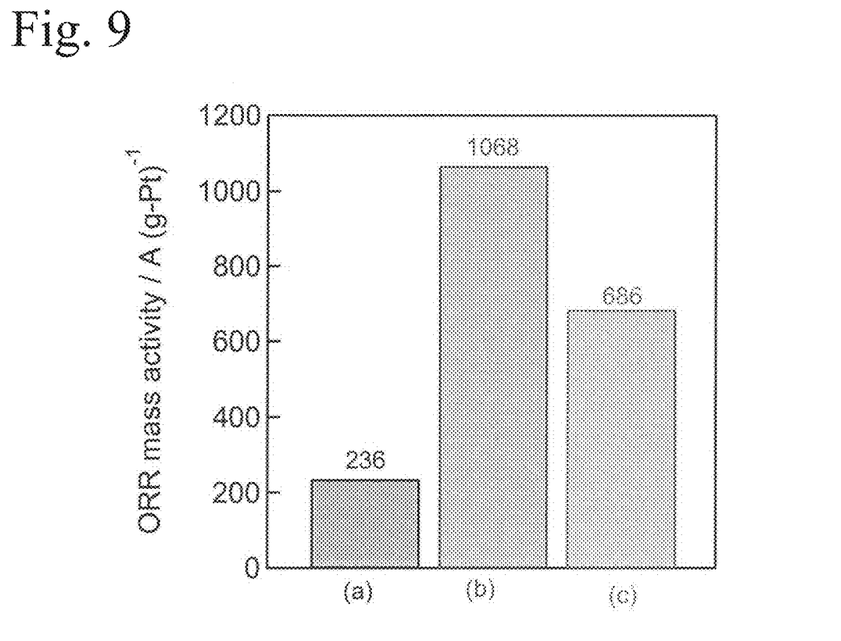
FIG. 9A is a graph of ORR activity for the electrocatalyst that supports Pt nanoparticles on carbon.
FIG. 9B is a graph of ORR activity for an electrocatalyst that supports, on carbon, the core-shell structure type nanosheet made of a metal ruthenium nanosheet core/platinum shell (UPD-platinum replacement method: 4 times).
FIG. 9C is a graph of ORR activity for the electrocatalyst that supports, on carbon, the core-shell structure type nanosheet made of a metal ruthenium nanosheet core/platinum shell (UPD-platinum replacement method: 5 times).

FIG. 9A is a graph of oxidation reduction reaction (ORR) activity assigned by Pt amount for the electrocatalyst that supports Pt nanoparticles on a carbon. FIG. 9B is a graph of ORR activity for an electrocatalyst that supports, on carbon, the core-shell structure type nanosheet made of the metal ruthenium nanosheet core/platinum shell (UPD-platinum replacement method: 4 times). FIG. 9C is a graph of ORR activity for an electrocatalyst that supports, on carbon, the core-shell structure type nanosheet made of the metal ruthenium nanosheet core/platinum shell (UPD-platinum replacement method: 5 times).

With regard to oxidation reduction reaction (ORR) activity, the core-shell structure type nanosheet made of the metal ruthenium nanosheet core/platinum shell (UPD-platinum replacement method: 4 times) has an ORR activity of 1,068 A/(g-Pt), 3.7 times that of the PU/C nanoparticles. Further, the core-shell structure type nanosheet made of the metal ruthenium nanosheet core/platinum shell (UPD-platinum replacement method: 5 times) also exhibited higher ORR activity than that of the Pt/C nanoparticles.

<Evaluation Experiment of Durability of Cathode Catalyst>

Figure 10:
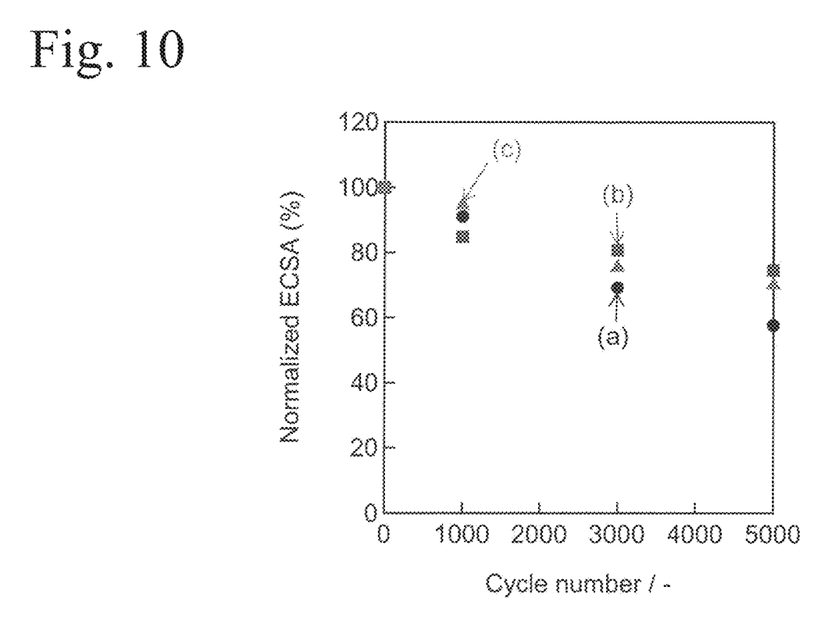
FIG. 10A is a plot of an ECSA decreasing rate after normalization using the initial ECSA for the electrocatalyst that supports Pt nanoparticles on carbon.
FIG. 10B is a plot of the ECSA decreasing rate after normalization using the initial ECSA for the electrocatalyst that supports, on carbon, the core-shell structure type nanosheet made of a metal ruthenium nanosheet core/platinum shell (UPD-platinum replacement method: 4 times).
FIG. 10C is a plot of the ECSA decreasing rate after normalization using the initial ECSA for the electrocatalyst that supports, on carbon, the core-shell structure type nanosheet made of a metal ruthenium nanosheet core/platinum shell (UPD-platinum replacement method: 5 times).

The durability of the cathode catalyst was evaluated based on the ECSA decreasing rate. FIG. 10A is a plot of an ECSA decreasing rate after normalization using the initial ECSA for the electrocatalyst that supports Pt nanoparticles on carbon. FIG. 10B is a plot of the ECSA decreasing rate after normalization using the initial ECSA for the electrocatalyst that supports, on carbon, the core-shell structure type nanosheet made of a metal ruthenium nanosheet core/platinum shell (UPD-platinum replacement method: 4 times). FIG. 10C is a plot of the ECSA decreasing rate after normalization using the initial ECSA for the electrocatalyst that supports, on carbon, the core-shell structure type nanosheet made of a metal ruthenium nanosheet core/platinum shell (UPD-platinum replacement method: 5 times).

As shown in FIGS. 10A to 10C, in the durability test, the degree of ECSA decrease in the core-shell structure type nanosheet made of the metal ruthenium nanosheet core/platinum shell (UPD-platinum replacement method: 2 times) was less pronounced than with Pt/C nanoparticles, and thus the core-shell structure type nanosheet made of the metal ruthenium nanosheet core/platinum shell (UPD-platinum replacement method: 2 times) was found to have a higher durability than that of the Pt/C nanoparticles.

DESCRIPTIONS OF REFERENCE NUMERALS

1 Metal nanosheet
2 Platinum atomic layer
10 Core-shell structure type nanosheet

What is claimed is:

1. A fuel cell, comprising:
a cathode catalyst or anode catalyst comprising an electrocatalyst, the electrocatalyst comprising carbon and a nanosheet supported on the carbon,
wherein the nanosheet comprises a metal ruthenium nanosheet, and a platinum atomic layer formed on an entire surface of the metal ruthenium nanosheet,
the metal ruthenium nanosheet is a monoatomic layer, and
the platinum atomic layer is a monoatomic layer or a monoatomic layer laminated body.

2. The fuel cell according to claim 1, wherein
the monoatomic layer or the monoatomic layer laminated body of the platinum atomic layer has a thickness of from 0.3 nm to 1.0 nm, inclusive.

3. The fuel cell according to claim 1, wherein the platinum atomic layer is a monoatomic layer.

4. The fuel cell according to claim 1, wherein the platinum atomic layer is a monoatomic layer laminated body.

5. The fuel cell according to claim 1, comprising the cathode catalyst comprising the electrocatalyst.

6. The fuel cell according to claim 1, comprising the anode catalyst comprising the electrocatalyst.

7. The fuel cell according to claim 2, wherein the platinum atomic layer is a monoatomic layer.

8. The fuel cell according to claim 2, wherein the platinum atomic layer is a monoatomic layer laminated body.

9. The fuel cell according to claim 1, wherein the metal ruthenium nanosheet has a thickness of from 0.2 nm to 0.3 nm.

10. The fuel cell according to claim 2, wherein the metal ruthenium nanosheet has a thickness of from 0.2 nm to 0.3 nm.

11. The fuel cell according to claim 1, wherein the carbon is at least one selected from the group consisting of carbon black, carbon nanotube, and graphene.

12. The fuel cell according to claim 2, wherein the carbon is at least one selected from the group consisting of carbon black, carbon nanotube, and graphene.

13. The fuel cell according to claim 5, wherein the carbon is at least one selected from the group consisting of carbon black, carbon nanotube, and graphene.

14. The fuel cell according to claim 6, wherein the carbon is at least one selected from the group consisting of carbon black, carbon nanotube, and graphene.

15. The fuel cell according to claim 1, wherein the carbon is at least one selected from the group consisting of carbon nanotube and graphene.

16. The fuel cell according to claim 5, wherein the carbon comprises carbon nanotube.

17. The fuel cell according to claim 5, wherein the carbon comprises graphene.

18. The fuel cell according to claim 6, wherein the carbon comprises carbon nanotube.

19. The fuel cell according to claim 6, wherein the carbon comprises graphene.

20. The fuel cell according to claim 1, wherein the fuel cell is a polymer electrolyte fuel cell.

* * * * *